Dec. 26, 1939.   T. V. BUCKWALTER   2,185,142
APPARATUS FOR DETERMINING BEARING PLAY
Filed Sept. 22, 1938   2 Sheets-Sheet 2
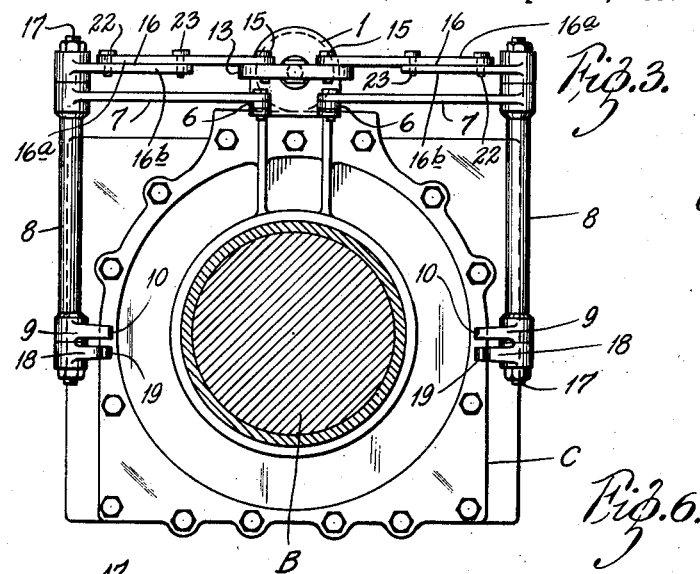
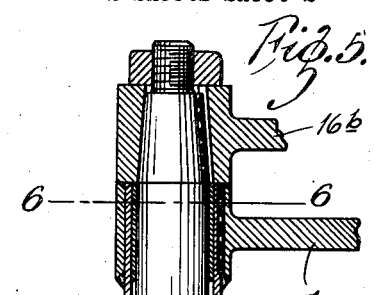
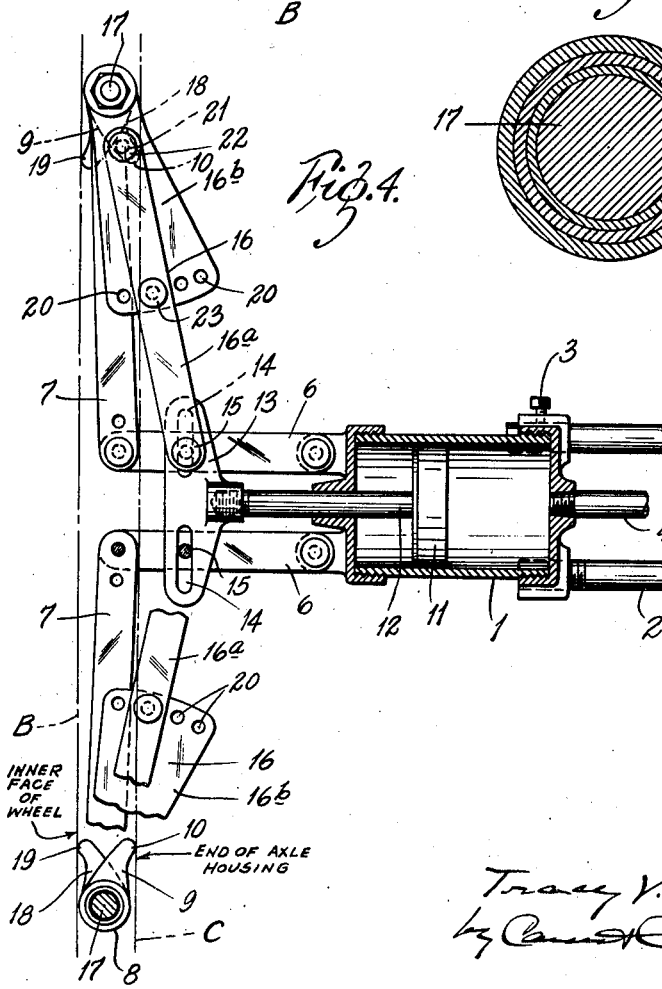
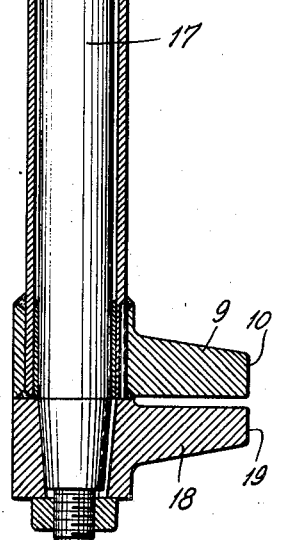
INVENTOR:
Tracy V. Buckwalter
HIS ATTORNEYS.

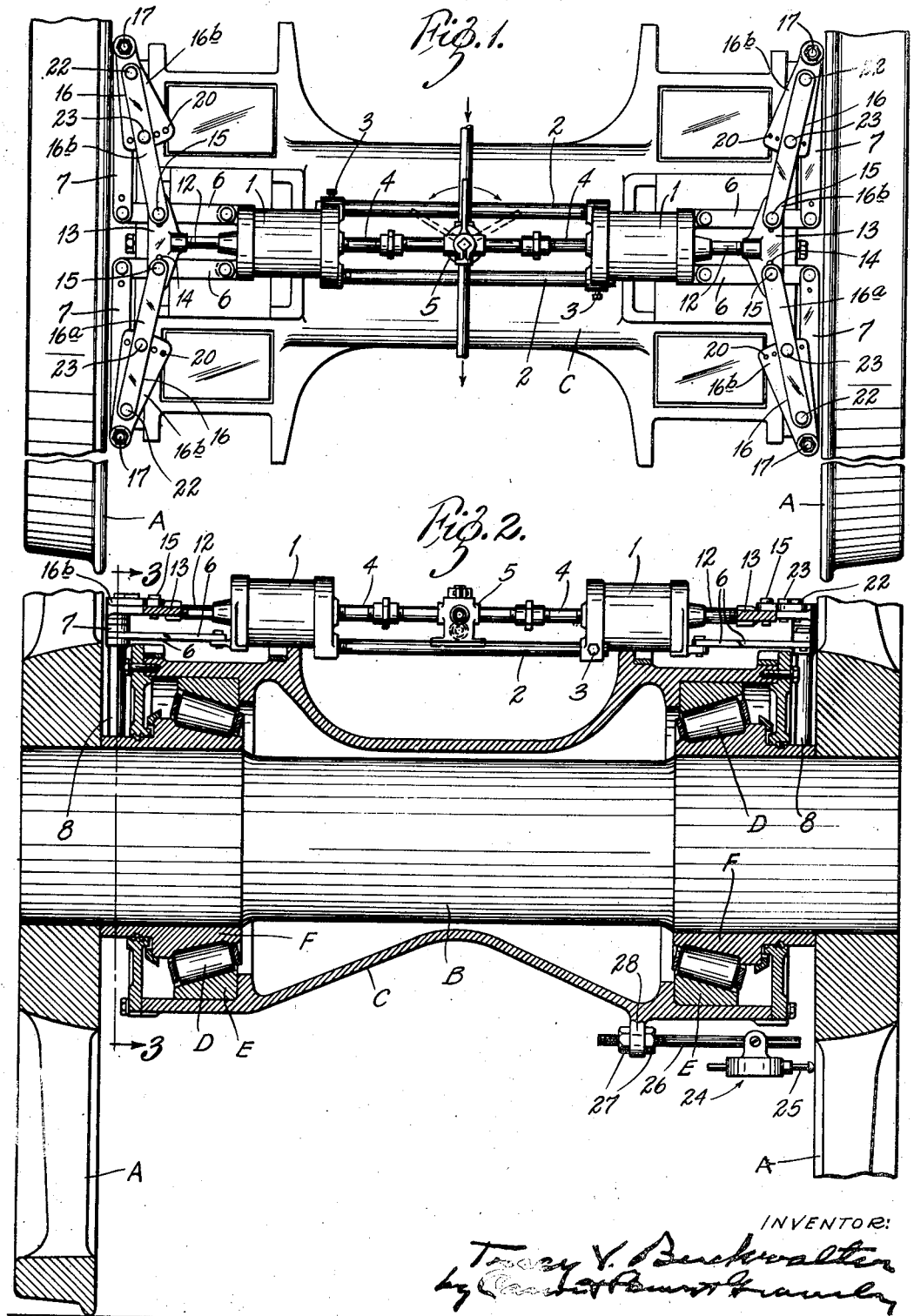

Patented Dec. 26, 1939

2,185,142

UNITED STATES PATENT OFFICE 2,185,142

APPARATUS FOR DETERMINING BEARING PLAY

Tracy V. Buckwalter, Massillon, Ohio, assignor to The Timken Roller Bearing Company, Canton, Ohio, a corporation of Ohio Application September 22, 1938, Serial No. 231,112

15 Claims. (Cl. 254—124)

This invention relates to apparatus for determining the axial play of bearings of axle constructions, particularly railway car axle constructions of the type wherein the wheels are press-fitted on an axle that extends through a housing and tapered roller bearings are interposed between the axle and the ends of the housing. In this type of construction, the bearing cups or outer raceway members are mounted in the ends of the housing and the cones or inner raceway members are mounted on the axle with the tapered rollers interposed between the inner and outer raceways, and the bearings are adjusted by relative axial movement of the cup and cone. The object of the present invention is to devise a practical, easy operable apparatus for accurately determining the amount of axial play of the bearings. The invention consists in the apparatus hereinafter described and claimed.

In the accompanying drawings, which form part of this specification and wherein like numerals refer to like parts wherever they occur, Fig. 1 is a plan view of my apparatus applied to a roller bearing railway car axle construction;

Fig. 2 is mainly a side elevation of said apparatus with the axle housing, bearings and wheels in section;

Fig. 3 is an elevation of said apparatus and the axle housing with the axle and a bearing cone in section on the line 3—3 in Fig. 2, Fig. 4 is a plan view of part of my apparatus with a cylinder thereof in section;

Fig. 5 is a detail view, partly in section, of the rock shafts and parts associated therewith; and Fig. 6 is a cross-sectional detail on the line 6—6 of Fig. 5.

In the accompanying drawings, my apparatus is illustrated in connection with a roller bearing locomotive driving axle construction comprising wheels A press-fitted on the ends of an axle B, which turns inside a housing C, and tapered bearings rollers D interposed between cups or outer raceway members E mounted in the ends of said housing and cones or inner raceway members F mounted on said axle in abutting relation to the inner faces of the respective wheels. In this type of axle construction, the running adjustment of the reversely tapered roller bearings is usually obtained by holding the axle and one wheel against endwise movement while the other wheel is being pressed on the axle.

Said apparatus comprises two cylinders 1 secured together in alinement with each other by distance rods 2, each preferably having one end threaded into one cylinder head and the other end slidable in the other cylinder head and locked therein by a set screw 3, thus permitting adjustment of the distance between cylinders. The near ends of the cylinders are provided with a pipe 4 which communicates through a four-way valve 5 with a suitable source of fluid pressure, preferably air pressure. The devices associated with one of the cylinders are duplicates or counterparts of the devices associated with the other cylinder so that the description of one set of such devices is applicable to the other set also.

At the outer end of each cylinder, two horizontal links 6 are pivotally connected thereto. These horizontal links are pivotally connected, respectively, to horizontal arms 7 which, in turn, are rigidly secured, respectively, to the upper ends of vertical tubes or hollow shafts 8, hereinafter called the outer shafts. Each of these outer shafts has a short arm 9, hereinafter called a spreading finger, rigidly secured to its lower end and terminating in a laterally disposed tip 10 with a rounded edge surface suitable for bearing against one end of the axle housing A.

Each cylinder is provided with a piston 11 and a piston rod 12. The outer end of the piston rod has a block or crosshead 13 secured thereto, the crosshead being provided with elongated slots 14 disposed in alinement with each other on opposite sides of the axis of the piston. In these elongated slots slide pins 15 which are mounted respectively on long sectional arms 16 which are rigidly connected respectively to the projecting upper ends of shaft 17 journaled in the hollow outer shafts 8 above mentioned. Each inner shaft 17 has a short arm or spreading finger 18 at its projecting lower end and the side edge of the tip of the short arm is rounded suitably, as at 19, to bear against the inner face of the adjacent wheel. Preferably the arms 16 and 18 of the inner shaft 17 are welded thereto with the hub of the long sectional arm 16 of the inner shaft 17 in sliding contact with the upper end of the hub of the long arm 7 on the outer shaft 8, and with the hub of the short arm or spreading finger 18 of the inner shaft in sliding contact with the lower end of the hub of the short arm or spreading finger 9 of the outer shaft.

Each of the sectional arms 16 comprises two sections, one of which (16a) is pivotally and slidably connected to the crosshead or piston block 13 as above described, and the other of which (16b) is rigidly connected to the inner shaft 17. The section 16b that is fixed to the inner shaft is preferably in the form of a quadrant arm with a series of pin holes 20 arranged in a circular arc near its outer end and with another pin hole 21 near its inner end, said last mentioned hole being at the center of said circular arc. The section 16a is a plain arm or link with a pin 15 mounted in one end for pivotal and sliding movement in the slot 14 of the cross-head or piston block 13 and with a pin or bolt 22 in its opposite end and extending through the central hole 21 of the quadrant section 16b. This plain arm 16a has an intermediate pin or bolt 23 in position to register with one or another of the arcuate series of holes 20 in said quadrant member according as said plain arm is swung on its pivot.

A suitable dial indicator 24 is provided for measuring the total amount of end play of both bearings. Said indicator is disposed with its stem 25 in abutting relation to the inner face of one of the wheels A and is supported on one end of rods 26 whose other end is adjustably secured by nuts 27 to a lug 28 on the adjacent end portions of the axle housing C.

The operation of the apparatus hereinbefore described is as follows: The apparatus is set on top of the axle housing with the two pairs of spreading fingers at each end of the apparatus suspended between the corresponding end of said housing and the adjacent wheel and disposed on opposite sides of the axle. The four-way valve is then opened to admit air or other fluid into the cylinder nearest the right hand indicator supporting end of the axle housing. The air pressure imparts relative axial movement to the piston and cylinder, the piston moving outwardly and transmitting its motion through its piston rod and the crosshead thereon through the sectional arms 16 to the two inner shafts 8 associated therewith, thereby rotating said shafts in a clockwise direction and thus swinging the spreading fingers 18 at the lower ends thereof against the inner face of the adjacent wheel. At the same time, this same air pressure is exerted against the near end of the cylinder causing inward movement thereof and this movement is transmitted through the links 6 attached to the outer end of said cylinder and thence to the long arms 7 on the hollow outer shafts 8, causing both of said hollow shafts to turn in an anti-clockwise direction and force the spreading fingers at the bottom thereof into engagement with the adjacent end of the axle housing.

Thus the two spreading fingers of each double shaft at the right hand or indicator end of the axle housing are swung in opposite directions, the inner shaft 17 being turned by the push of the piston until its finger 18 brings up against the face of the wheel, and the outer shaft 8 being turned in a reverse direction by the pull of the cylinder until its finger 9 bears against the end of the axle housing and forces said housing endwise to the left as far as the roller bearing in its left hand end will permit. The dial indicator 24 is then set at zero with its stem in contact with the inner face of the right hand wheel. Then the four-way valve is turned to release the pressure in the right hand cylinder and admit pressure into the left hand cylinder, thereby opening the two spreading fingers of each double shaft at the left hand end of the axle housing and pushing said housing to the right until the rollers of the right hand bearing seat against its raceways. In this position of the parts, the indicator reading indicates total amount of end play of both roller bearings. With this information, the parts may then be adjusted in any desired manner to take up the play indicated minus the slight running clearance required for the bearings.

By the arrangement described, the amount of axle play of the bearings may be quickly and accurately determined. The power is easily applied and controlled and the pressure equally distributed on both side of the axle. The apparatus may be used on practically all types of roller bearing railway axle constructions without alteration thereof. The apparatus is free to float endwise of the axle to allow for reaction of the cylinders and to equalize the pressures on opposite sides of the axle. The sectional arms of the inner shafts provide a wide range of initial positions of the spreading fingers thereon, while the slotted piston rod yokes permit accurate motion of the arms in the different positions of adjustment of the quadrant arms.

While my apparatus is especially useful in determining the play of bearings of locomotive driving axle constructions, it is also applicable to other roller bearing constructions which require accurate adjustment of the bearings and are difficult to handle manually.

What I claim is:

1. Apparatus for use in determining the bearing play of a roller bearing railway car axle construction wherein the roller bearing is interposed between a housing and an axle turning therein and provided beyond the ends thereof with wheels, said apparatus comprising two movably mounted members adapted to be interposed between one end of said housing and the wheel adjacent thereto, and means for moving said members in opposite directions into engagement with said end of said housing and said wheel, respectively, to take up the play of said bearing, said means comprising a fluid cylinder free to float endwise of said axle construction, a piston in said cylinder, an operative connection between said cylinder and one of said members, and an operative connection between said piston and the other of said members.

2. Apparatus for use in determining the bearing play of a roller bearing railway car axle construction, wherein two reversely tapered roller bearings are interposed between a housing and an axle turning therein and provided beyond the ends thereof with wheels, said apparatus comprising two spreading fingers adapted to be interposed between each wheel and the adjacent end of said housing and mounted for independent rotation about a common axis, and means for rotating said fingers in opposite directions into engagement with the adjacent wheel and housing.

3. Apparatus for use in determining the bearing play of a roller bearing railway car axle construction, wherein two reversely tapered roller bearings are interposed between a housing and an axle turning therein and provided beyond the ends thereof with wheels, said apparatus comprising two spreading fingers adapted to be interposed between each wheel and the adjacent end of said housing and mounted for independent rotation about a common axis, and means for rotating said fingers in opposite directions into engagement with the adjacent wheel and housing, said means comprising a fluid cylinder, operatively connected to one of the fingers of each pair and a piston in said cylinder operatively connected to the other finger of said pair, and means for supplying the fluid to said cylinder to cause relative endwise movement of said piston and cylinder.

4. Apparatus for use in determining the bearing play of a roller bearing railway car axle construction wherein two reversely tapered roller bearings are inteposed between a housing and an axle tuning therein and provided beyond the ends thereof with wheels, said apparatus comprising two pairs of spreading fingers adapted to be arranged on opposite sides of said axle between one end of said housing and the adjacent wheel, two pairs of spreading fingers adapted to be arranged on opposite sides of said axle between the other end of said housing and the adjacent wheel, the two fingers of each pair being reversely rotatable about a common axis, into engagement with the adjacent housing end and wheel, respectively, two fluid cylinders adapted to be mounted on said housing, pistons in the respective cylinders, means for supplying fluid pressure to the respective cylinders to cause relative axial movement of said pistons and cylinders, an operative connection between one of said cylinders and one of the two fingers of each of the two first mentioned pairs of fingers, an operative connection between the piston in said cylinder on the other of the two fingers of each of the two first mentioned pairs of fingers, and similar operative connections between the other cyllinder and piston and the two second mentioned pairs of fingers.

5. Apparatus for use in determining the bearing play of a roller bearing railway car axle construction wherein two reversely tapered roller bearings are interposed between a housing and an axle turning therein and provided beyond the ends thereof with wheels, said apparatus comprising two pairs of spreading fingers adapted to be arranged on opposite sides of said axle between one end of said housing and the adjacent wheel, two pairs of spreading fingers adapted to be arranged on opposite sides of said axle between the other end of said housing and the adjacent wheel, the two fingers of each pair being reversely rotatable about a common axis, into engagement with the adjacent housing end and wheel, respectively, two fluid cylinders adapted to be mounted on said housing, pistons in the respective cylinders, means for supplying fluid pressure to the respective cylinders to cause relative axial movement of said pistons and cylinders, an operative connection between one of said cylinders and one of the two fingers of each of the two first mentioned pairs of fingers, an operative connection between the piston in said cylinder on the other of the two fingers of each of the two first mentioned pairs of fingers, and similar operative connections between the other cylinder and piston and the two second mentioned pairs of fingers, the connections between each cylinder and the fingers controlled thereby comprising arms rotatable with the fingers and link connections between the arms and cylinder, and the connections between each piston and the fingers controlled thereby comprising arms rotatable with the fingers and connected to the piston.

6. Apparatus of the kind described comprising two spreading fingers mounted for rotation about a common axis, and means for rotating said fingers in opposite directions about said axis, said means comprising a member operatively connected to one of said fingers and a member operatively connected to the other of said fingers, and means for simultaneously moving said members in opposite directions.

7. Apparatus of the kind described comprising two spreading fingers mounted for rotation about a common axis, and means for rotating said fingers in opposite directions about said axis, said means comprising a cylinder, a piston working therein, arms rotatable with the respective cylinders, and connections between said cylinder and piston and the respective arms.

8. Apparatus of the kind described comprising two spreading fingers mounted for rotation about a common axis, and means for simultaneously rotating said fingers in opposite directions about said axis, said means comprising a cylinder, a piston thereon, arms rotatable with the respective fingers, a link connection between one of said arms and said cylinder, a crosshead movable with said piston, and a slot-and-pin connection between said crosshead and the other arm.

9. Apparatus of the kind described comprising two pairs of spreading fingers, the two fingers of each pair being mounted for rotation about a common axis, and means for rotating the two fingers of each pair in opposite directions, said means comprising a fluid cylinder operatively connected to one finger of each pair and a piston in said cylinder and operatively connected to the other finger of each pair.

10. Apparatus of the kind described comprising two pairs of spreading fingers, the two fingers of each pair being mounted for rotation about a common axis, and means for rotating the two fingers of each pair in opposite directions, said means comprising a fluid cylinder, a piston therein, a crosshead movable with said piston arms rotatable with the respective fingers, link connections between said cylinder and the arms rotatable with one finger of each pair, links connecting said crosshead and the arms rotatable with the other fingers of the two pairs, each of said last mentioned arms having a series of holes therein arranged in a circular arc and a hole intermediate said series of the end holes and the pivoted ends of said arm, and a pin registering with said hole and one or another of said arcuate series of holes.

11. Apparatus of the kind described comprising a hollow shaft and a shaft in said hollow shaft, spreading fingers fixed to the respective shafts, and means for rotating said shafts in opposite directions.

12. Apparatus of the kind described comprising a hollow shaft and a shaft in said hollow shaft, spreading fingers fixed to the respective shafts, and means for rotating said shafts in opposite directions, said means comprising a fluid cylinder operatively connected to one of said shafts and a piston in said cylinder operatively connected to the other of said shafts.

13. Apparatus of the kind described comprising two hollow shafts, shafts rotatable in the respective hollow shafts, arms fixed to the respective shafts, spreading fingers fixed to the respective shafts, a cylinder, link connections between said cylinder and the respective arms of said hollow shafts, a piston in said cylinder, a rod fixed to said piston, a crosshead fixed to said rod, and link connections between said crosshead and the shafts rotatable in said hollow shafts.

14. Apparatus of the kind described comprising two cylinders secured together in alinement with each other, two hollow shafts associated with each cylinder, shafts rotatable in said hollow shafts, arms rigid with said shafts, spreading fingers rigid with said shafts, link connection between each cylinder and the arms of the two hollow shafts associated therewith, a piston in each cylinder, a crosshead movable with each piston, and link connections between the crosshead of each piston and the arms of the shafts in the two hollow shafts associated with the cylinder for said piston.

15. Apparatus of the kind described comprising two cylinders secured together in alinement with each other, two hollow shafts associated with each cylinder, shafts rotatable in said hollow shafts, arms rigid with said shafts, spreading fingers rigid with said shafts, link connection between each cylinder and the arms of the two hollow shafts associated therewith, a piston in each cylinder, a crosshead movable with each piston, link connections between the crosshead of each piston and the arms of the shafts in the two hollow shafts associated with the cylinder for said piston, each of said last mentioned arms comprising two sections one fixed to said shaft and the other having a slot-and-pin connection with said crosshead, the section that is fixed to the shaft having series of holes therein arranged in a circular arc near its outer end and another pin hole therein near its inner end, said last mentioned hole being at the center of said circular arc, and a pin in said other section in position to register with the other of said arcuate series of holes.

TRACY V. BUCKWALTER.